United States Patent
Yu et al.

(10) Patent No.: US 12,302,289 B2
(45) Date of Patent: May 13, 2025

(54) FACILITATING SIDELINK MODE 2 RANDOM SELECTION FOR SUPPORT OF SIDELINK DRX

(71) Applicant: Nokia Technologies Oy, Espoo (FI)

(72) Inventors: Ling Yu, Kauniainen (FI); Vinh Van Phan, Oulu (FI); Lianghai Ji, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 17/392,454

(22) Filed: Aug. 3, 2021

(65) Prior Publication Data

US 2022/0053460 A1 Feb. 17, 2022

Related U.S. Application Data

(60) Provisional application No. 63/065,548, filed on Aug. 14, 2020.

(51) Int. Cl.
*H04W 72/04* (2023.01)
*H04B 7/06* (2006.01)
*H04B 17/318* (2015.01)
*H04L 1/00* (2006.01)
*H04W 24/10* (2009.01)
*H04W 72/02* (2009.01)
*H04W 72/1263* (2023.01)
*H04W 72/1268* (2023.01)

(Continued)

(52) U.S. Cl.
CPC ........... *H04W 72/02* (2013.01); *H04W 72/20* (2023.01); *H04W 72/56* (2023.01); *H04W 76/28* (2018.02)

(58) Field of Classification Search
CPC ... H04W 74/0866; H04W 72/08; H04W 4/40; H04W 72/04; H04W 76/27; H04W 28/26; H04W 72/535; H04W 72/02; H04L 2209/80; H04L 43/065; H04L 5/0037
USPC .......................................... 455/464; 370/437
See application file for complete search history.

(56) References Cited

U.S. PATENT DOCUMENTS

2017/0048786 A1* 2/2017 Belleschi ............. H04L 5/1469
2020/0015272 A1* 1/2020 Lee ....................... H04W 72/23
(Continued)

OTHER PUBLICATIONS

LG Electronics "New WID on NR Sidelink Enhancements" 3GPP TSG RAN Meeting #86 RP-193231. Sitges, Spain, Dec. 9-12, 2019.
(Continued)

*Primary Examiner* — Marcus Smith
*Assistant Examiner* — Jason A Harley
(74) *Attorney, Agent, or Firm* — Barta Jones, PLLC

(57) ABSTRACT

Systems, methods, apparatuses, and computer program products for facilitating sidelink mode 2 random selection for support of sidelink DRX. A method may include receiving, with a first user equipment from a network node, an allocation of one or more physical sidelink control channel resources, wherein the first user equipment is configured to perform sidelink discontinuous reception. The method may also include performing autonomous selection of one or more resources of a physical sidelink shared channel from a resource pool. The method may further include performing sidelink communication with at least one of a resource of the one or more allocated physical sidelink control channel resources, or a resource of the one or more selected resources of the physical sidelink shared channel.

15 Claims, 6 Drawing Sheets

(51) Int. Cl.
*H04W 72/20* (2023.01)
*H04W 72/21* (2023.01)
*H04W 72/25* (2023.01)
*H04W 72/56* (2023.01)
*H04W 76/28* (2018.01)

(56) References Cited

U.S. PATENT DOCUMENTS

| | | |
|---|---|---|
| 2021/0059005 A1* | 2/2021 | Hosseini ................ H04W 4/40 |
| 2021/0105787 A1* | 4/2021 | Park ..................... H04L 43/16 |
| 2021/0168852 A1* | 6/2021 | Panteleev ............ H04L 5/0055 |
| 2021/0212026 A1* | 7/2021 | Peng ................... H04W 72/02 |
| 2021/0227604 A1* | 7/2021 | Huang ................. H04W 72/02 |
| 2021/0250954 A1* | 8/2021 | Li ........................ H04L 1/1887 |
| 2021/0258920 A1* | 8/2021 | Baghel ................ H04W 16/14 |
| 2021/0266951 A1* | 8/2021 | Gulati ................. H04B 17/327 |
| 2021/0329431 A1* | 10/2021 | Su ...................... H04L 5/0094 |
| 2022/0039065 A1* | 2/2022 | Yang ................... H04W 72/02 |
| 2023/0199909 A1* | 6/2023 | Mohammad ...... H04W 52/0235 |
| | | 370/329 |

OTHER PUBLICATIONS

3GPP TS 38.331 V0.0.1 3$^{rd}$ Generation Partnership Project; Technical Specification Group Radio Access Network; NR; Radio Resource Control (RRC); Protocol Specification (Release 15) Mar. 2017.

* cited by examiner

FACILITATING SIDELINK MODE 2 RANDOM SELECTION FOR SUPPORT OF SIDELINK DRX

RELATED APPLICATIONS

The present application claims priority from U.S. Provisional Patent Application No. 63/065,548, filed on Aug. 14, 2020, which is hereby incorporated in its entirety.

BACKGROUND

Technical Field

The example and non-limiting embodiments relate generally to sidelink communication and, more particularly, to sidelink resource selection.

Brief Description of Prior Developments

It is known, for a user equipment configured to perform sidelink communication, to perform sidelink resource allocation in mode 1 or mode 2.

SUMMARY

The following summary is merely intended to be illustrative. The summary is not intended to limit the scope of the claims.

In accordance with one aspect, a method comprising: receiving, with a first user equipment from a network node, an allocation of one or more physical sidelink control channel resources, wherein the first user equipment is configured to perform sidelink discontinuous reception; performing autonomous selection of one or more resources of a physical sidelink shared channel from a resource pool; and performing sidelink communication with at least one of: a resource of the one or more allocated physical sidelink control channel resources, or a resource of the one or more selected resources of the physical sidelink shared channel.

In accordance with one aspect, an apparatus comprising: at least one processor; and at least one non-transitory memory and computer program code, wherein the at least one memory and the computer program code are configured to, with the at least one processor, cause the apparatus to: receive, from a network node, an allocation of one or more physical sidelink control channel resources, wherein the apparatus is configured to perform sidelink discontinuous reception; perform autonomous selection of one or more resources of a physical sidelink shared channel from a resource pool; and perform sidelink communication with at least one of: a resource of the one or more allocated physical sidelink control channel resources, or a resource of the one or more selected resources of the physical sidelink shared channel.

In accordance with one aspect, an apparatus comprising means for performing: receiving, from a network node, an allocation of one or more physical sidelink control channel resources, wherein the apparatus is configured to perform sidelink discontinuous reception; performing autonomous selection of one or more resources of a physical sidelink shared channel from a resource pool; and performing sidelink communication with at least one of: a resource of the one or more allocated physical sidelink control channel resources, or a resource of the one or more selected resources of the physical sidelink shared channel.

In accordance with one aspect, a non-transitory computer-readable medium comprising program instructions stored thereon which, when executed with at least one processor, cause the at least one processor to: receive, with a first user equipment from a network node, an allocation of one or more physical sidelink control channel resources, wherein the first user equipment is configured to perform sidelink discontinuous reception; perform autonomous selection of one or more resources of a physical sidelink shared channel from a resource pool; and perform sidelink communication with at least one of: a resource of the one or more allocated physical sidelink control channel resources, or a resource of the one or more selected resources of the physical sidelink shared channel.

In accordance with one aspect, a method comprising: transmitting, to a sidelink user equipment, a configuration configured to enable the sidelink user equipment to perform sidelink discontinuous reception operation, receive a physical sidelink control channel resource allocation, and perform autonomous selection of physical sidelink shared channel resources from a resource pool; receiving, from the sidelink user equipment, a request for the physical sidelink control channel resource allocation; and transmitting, to the sidelink user equipment, the physical sidelink control channel resource allocation in response to the request.

In accordance with one aspect, an apparatus comprising: at least one processor; and at least one non-transitory memory and computer program code, wherein the at least one memory and the computer program code are configured to, with the at least one processor, cause the apparatus to: transmit, to a sidelink user equipment, a configuration configured to enable the sidelink user equipment to perform sidelink discontinuous reception operation, receive a physical sidelink control channel resource allocation, and perform autonomous selection of physical sidelink shared channel resources from a resource pool; receive, from the sidelink user equipment, a request for the physical sidelink control channel resource allocation; and transmit, to the sidelink user equipment, the physical sidelink control channel resource allocation in response to the request.

In accordance with one aspect, an apparatus comprising means for performing: transmitting, to a sidelink user equipment, a configuration configured to enable the sidelink user equipment to perform sidelink discontinuous reception operation, receive a physical sidelink control channel resource allocation, and perform autonomous selection of physical sidelink shared channel resources from a resource pool; receiving, from the sidelink user equipment, a request for the physical sidelink control channel resource allocation; and transmitting, to the sidelink user equipment, the physical sidelink control channel resource allocation in response to the request.

In accordance with one aspect, a non-transitory computer-readable medium comprising program instructions stored thereon which, when executed with at least one processor, cause the at least one processor to: transmit, to a sidelink user equipment, a configuration configured to enable the sidelink user equipment to perform sidelink discontinuous reception operation, receive a physical sidelink control channel resource allocation, and perform autonomous selection of physical sidelink shared channel resources from a resource pool; receive, from the sidelink user equipment, a request for the physical sidelink control channel resource allocation; and transmit, to the sidelink user equipment, the physical sidelink control channel resource allocation in response to the request.

In accordance with one aspect, an apparatus, comprising: at least one processor; and at least one non-transitory memory and computer program code, wherein the at least one memory and the computer program code are configured to, with the at least one processor, cause the apparatus to: transmit, to a sidelink user equipment, a configuration configured to enable the sidelink user equipment to perform sidelink discontinuous reception operation; receive, from the sidelink user equipment, a request for the physical sidelink control channel resource allocation; and transmit, to the sidelink user equipment, the physical sidelink control channel resource allocation in response to the request.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
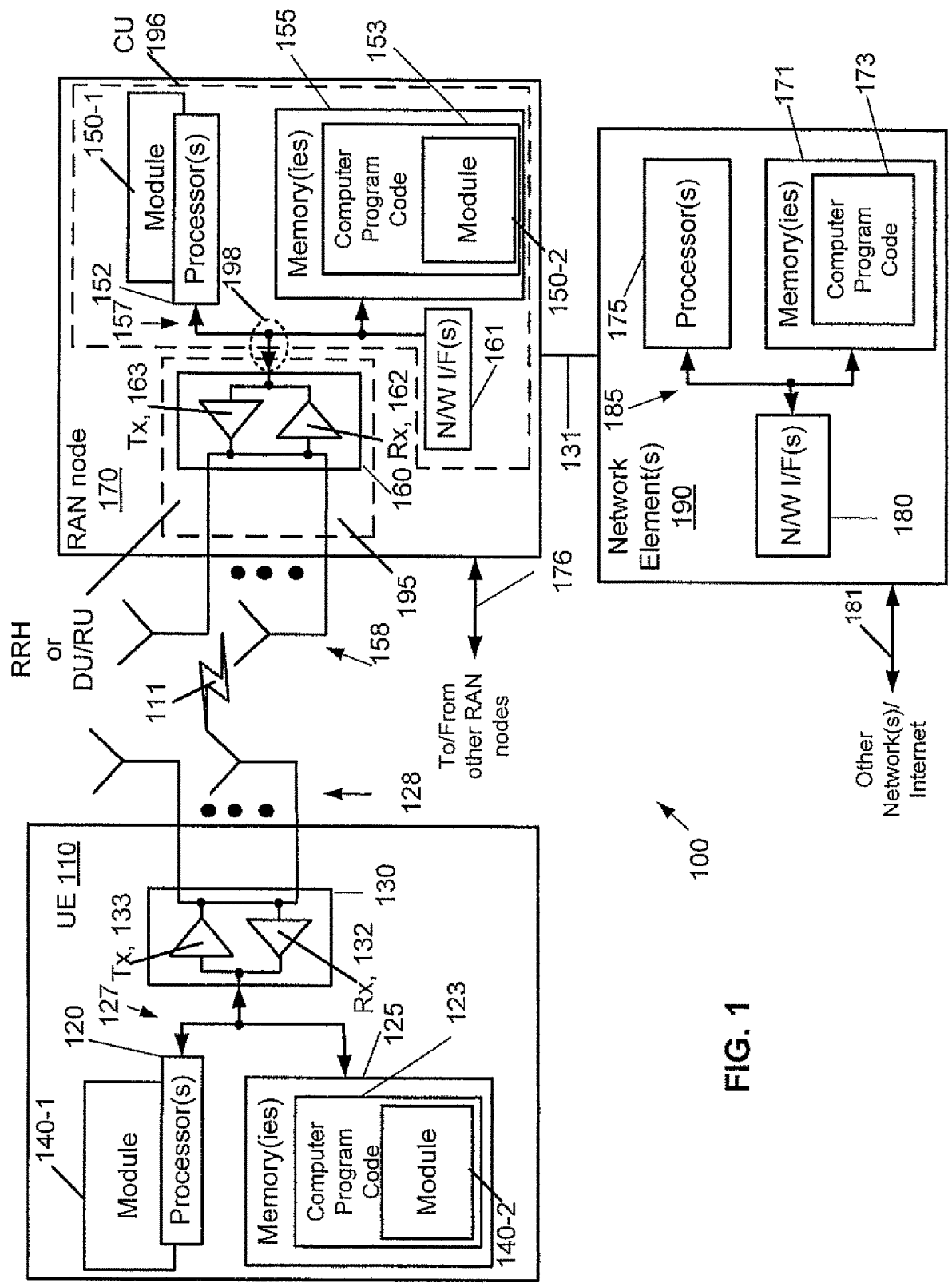
FIG. 1 is a block diagram of one possible and non-limiting exemplary system in which the exemplary embodiments may be practiced.

The following abbreviations that may be found in the specification and/or the drawing figures are defined as follows:
3GPP third generation partnership project
5G fifth generation
5GC 5G core network
AMF access and mobility management function
BS base station
CG configured grant
CP control plane
CSI channel state information
CU central unit
DL downlink
DRX discontinuous reception
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
HARQ hybrid automatic repeat request
I/F interface
L1 layer 1
LTE long term evolution
MAC medium access control
MCS modulation and coding scheme
MME mobility management entity
ng or NG new generation
ng-eNB or NG-eNB new generation eNB
NR new radio
N/W or NW network
PDCP packet data convergence protocol
PHY physical layer
PSCCH physical SL control channel
PSSCH physical SL shared channel
RAN radio access network
RF radio frequency
RLC radio link control
RS reference signal
RRH remote radio head
RRC radio resource control
RU radio unit
Rx receiver
SCI sidelink control information
SDAP service data adaptation protocol
SGW serving gateway
SIB system information block
SL sidelink
SL-RSRP sidelink reference signal received power
SMF session management function
SPS semi-persistent scheduling
TB transport block
TTI transmission time interval
Tx transmitter
UE user equipment (e.g., a wireless, typically mobile device)
UL uplink
UP user plane
UPF user plane function
Uu interface between BS and UE
V2X vehicle to everything
VRU vulnerable road users Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

Although not illustrated in FIG. 1, the UE 110 may also communicate with other UEs via short range communication technologies, such as Bluetooth®. If wireless communication with a network is unavailable or not possible, or in addition to network communication, the UE 110 may be capable of sidelink communication with other UEs.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. In addition, various embodiments of the user equipment 110 can include, but are not limited to, devices integrated into vehicles, infrastructure associated with vehicular travel, wearable devices used by pedestrians or other non-vehicular users of roads, user equipment unrelated to traffic users, and user equipment configured to participate in sidelink scenarios, such as public safety user equipment and/or other commercial user equipment.

Features as described herein generally relate to, while not being limited to, new radio (NR) sidelink (SL) enhancements in 3GPP release 17 and/or beyond. For example, NR SL methods may be implemented to provide communication between a vehicle and a network, infrastructure(s), other vehicle(s), or other road user(s) in the surrounding/immediate area. Such communication may enable proximity service (ProSe), or transmission of information about the surrounding environment, between devices in close proximity, for example device-to-device (D2D) communication technology. Such direct communication may be available even when network coverage is unavailable. Additionally or alternatively, NR SL methods may be implemented in scenarios unrelated to traffic users, such as public safety scenarios and/or commercial scenarios. Enhancements to sidelink procedures may be configured to provide power savings in these vehicle-to-everything (V2X) and other use cases. It should be noted that enhancements configured to provide power savings in sidelink procedures may not be limited to unicast procedures; a person of ordinary skill in the art would understand that the present disclosure may relate to sidelink groupcast, multicast, and/or broadcast procedures as well.

In the present disclosure, there may be disclosed example embodiments configured to enable SL UE power savings in using SL technology for communication.

In 3GPP Release 16, NR V2X has been developed to support the advanced V2X services. In 3GPP Release 17, NR SL may be enhanced to support wider use cases such as public safety, entertainment and other commercial applications. In these and other applications, power saving may be considered a key requirement. For example, in 3GPP Rel. 17, the work item (WI) on NR Sidelink Enhancement [3GPP RP-193231] stated that:

"Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized."

Accordingly, sidelink enhancements may be implemented to provide power saving in SL UEs. That document [3GPP RP-193231] also provides the following relevant objectives:

" . . . 2. Resource allocation enhancement:

Specify resource allocation to reduce power consumption of the UEs

Baseline is to introduce the principle of Rel-14 LTE sidelink random resource selection and partial sensing to Rel-16 NR sidelink resource allocation mode 2.

Note: Taking Rel-14 as the baseline does not preclude introducing a new solution to reduce power consumption for the cases where the baseline cannot work properly.

Study the feasibility and benefit of the enhancement(s) in mode 2 for enhanced reliability and reduced latency in consideration of both PRR and PIR defined in TR37.885 (by RAN #89), and specify the identified solution if deemed feasible and beneficial A set of resources is determined at UE-A. This set is sent to UE-B in mode 2, and UE-B takes this into account in the resource selection for its own transmission 3. Sidelink DRX for broadcast, groupcast, and unicast Define on- and off-durations in sidelink and specify the corresponding UE procedure Specify mechanism aiming to align sidelink DRX wake-up time among the UEs communicating with each other Specify mechanism aiming to align sidelink DRX wake-up time with Uu DRX wake-up time in an in-coverage UE . . . "

The combination of the objectives of resource allocation enhancement to enhance reliability and reduce latency for SL UE operation, and enablement of discontinuous reception (DRX) in SL UEs to provide power savings, may result in practical issues. For example, when SL DRX is enabled and an SL UE is operating in mode 2 SL resource allocation, an SL UE may not listen to or receive sidelink transmission(s), including sidelink control information (SCI) over physical sidelink control channel (PSCCH) during an OFF period of the SL DRX cycle. This will impact the sensing in mode 2 resource allocation and therefore the performance of SL communication using mode 2 resource allocation.

NR SL was specified in 3GPP Rel. 16 to support V2X services. As in LTE SL design, there are two resource allocation modes. In SL resource allocation mode 1, the network/network node/base station, e.g., NG-RAN, schedules SL transmission resource(s) for SL UE(s). In SL resource allocation mode 2, an SL UE autonomously selects SL transmission resources from a pool of resources. In mode 2, the UE performs a sensing procedure in order to receive the resource reservation information of other nearby UEs from their transmitted SCIs. Afterwards, the UE may select resource(s) for transmission based on the outcome of the sensing procedure. SL resource allocation mode 2 may also to be referred to as "sensing based mode 2 resource allocation."

In NR SL, the SL control information (SCI) indicates the resource and other transmission parameters used by a SL Tx LIE for transmitting transport block (TB) of SL data and other control information, such as channel state information (CSI) report. The SCI consists of two parts. In the 1st stage SCI, transmitted/received on PSCCH, resource allocation and modulation and coding scheme (MCS) related information is carried. This information is also used for sensing in mode 2 resource allocation. In the 2nd stage SCI, transmitted/received on PSSCH, hybrid automatic repeat request(s) (HARQ) and SL L2 IDs related information is carried.

In NR SL, the sensing based mode 2 resource allocation relies on continuously monitoring and receiving at least 1st stage SCI transmitted over PSCCH. The sensing history within the sensing window (e.g., 100 ms or 1100 ms as specified in TS 38.331) is used for the resource selection at an individual UE in mode 2. However, when SL DRX is enabled for SL UE in mode 2, the SL UE may not listen to or receive SL transmission(s) that occur during an OFF period of the SL DRX, such as 1st stage SCI transmitted over PSCCH during an OFF period of SL DRX cycle. Accordingly, a sensing history may not be available to the SL UE, at least, at the beginning of a next ON period of the DRX cycle of the SL UE, when UE wakes up from OFF period of the DRX cycle. Because SL resource allocation mode 2 relies on the information received from SCIs transmitted by proximity/nearby SL UEs in order to perform SL transmission resource selection, the sensing based mode 2 resource allocation might not be useable from the start of the next SL DRX ON period. In other words, the SL UE may not be able to perform transmission of SL control plane (CP) and/or user plane (UP) data over SL at the beginning of the next SL DRX ON period over the SL resources selected using sensing based mode 2 resource allocation.

Figure 2:
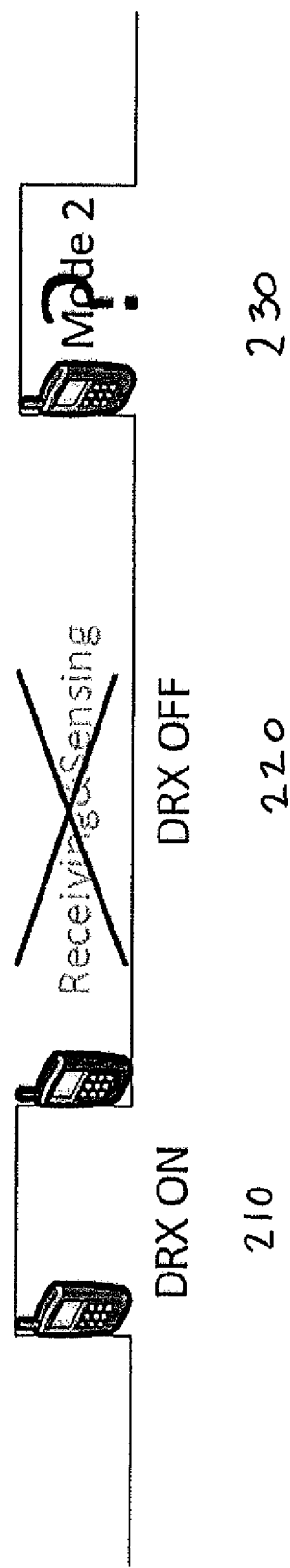
FIG. 2 is a diagram illustrating features as described herein.

Referring now to FIG. 2, illustrated is an example scenario in which an SL UE is configured with SL DRX and attempts to operate in SL resource allocation mode 2. At 210, the SL UE is in a DRX_ON period and can perform sidelink reception and transmission. At 220, the SL UE is in a DRX_OFF period and is not continuously monitoring, at least, PSCCH. Accordingly, the SL UE does not receive 1st stage SCI of nearby SL UEs during DRX_OFF period 220. At 230, the SL UE is in a DRX_ON period and may be interested in performing SL transmission. But because the SL UE did not receive $1^{st}$ stage SCI of nearby SL UEs (i.e. did not perform the sensing) at 220, at least at the beginning of the DRX_ON period at 230, the SL UE may not be able to autonomously select unoccupied SL transmission resources from a pool of resources because the SL UE does not have any information on the resources reserved by other nearby SL UEs.

Due to the lack of sensing history by a SL UE because the $1^{st}$ stage SCI(s) over PSCCH transmitted from nearby SL UEs were not monitored, random selection for mode 2 resource allocation may be more suitable for SL UEs with DRX configured than resource allocation based on the outcome of sensing the resource pool. SL mode 2 random selection was specified in LTE and NR SL. However, no collision resolution mechanism for random selection was supported. In the current random selection design, both PSCCH and PSSCH resources may be randomly selected by SL UE. If selected resources of two or more SL UEs collide with each other, the 1st stage SCI transmitted over PSCCH might not be received correctly by any SL UE(s). Thus, collision on PSSCH resources (e.g. 2nd stage SCI and/or SL data) might not be detectable for collision resolution. The poor performance of random selection due to collision proneness, and the lack of a specified collision resolution procedure, is well recognized, and may be especially problematic in a high UE density scenario, which many SL applicable use cases may have.

Instead of using SL resource allocation mode 2, the SL UE with SL DRX configured can be configured to use SL resource allocation mode 1. By using SL resource allocation mode 1, the SL UE with SL DRX configured may be able to avoid the sensing procedure, and therefore avoid a scenario as illustrated in FIG. 2. However, SL resource allocation mode 1 only applies for the SL UE in a radio resource control (RRC) connected state. Thus, additional power may be consumed in order to maintain the SL UE in RRC connected state. From power saving perspective, it may be desirable to keep the SL UE in an RRC idle or inactive state if there is no active UL/DL transmission over Uu interface for the SL UE. As SL DRX is designed to produce a power saving effect, it may not be reasonable to configure an SL UE with SL DRX to only use SL resource allocation mode 1.

In an example embodiment, procedure(s) for collision detection and resolution for SL mode 2 random selection for SL UE with DRX configured may be specified. In an example embodiment, an SL UE with DRX configured may be enabled to be allocated with dedicated PSCCH resources, as in SL mode 1, while allowing PSSCH resources to be selected from a SL mode 2 resource pool using random selection. Alternatively, PSSCH resources may be autonomously selected from the SL mode 2 resource pool using partial sensing based selection or full sensing based selection. In other words, selection of PSSCH resources may be performed using less than a full sensing history, or based on no sensing history. Such selection may make use of random selection methods known to one of ordinary skill in the art, or some other selection scheme known to one of ordinary skill in the art.

In an example embodiment, semi-persistent scheduling (SPS) and/or configured grant (CG) type of dedicated PSCCH resources from mode 1 resource pool may be allocated by a base station (BS) to an SL UE (UE1) with DRX configured. This resource allocation may be valid in the configured validity area regardless the RRC state (either RRC connected, inactive or idle state) of UE1. This may mean that the allocated PSCCH resources are still valid within the validity area even when UE1 enters an RRC inactive or idle state instead of staying in an RRC connected state. Optionally, the allocated SPS/CG type of dedicated PSCCH resource from the mode 1 resource pool may be configured to be valid in each of the SL DRX on-periods of UE1 until a sensing result in that on-period is available. For example, UE1 may use the allocated PSCCH resources from the mode 1 resource pool to transmit sidelink transmissions (i.e. 1st stage SCI) during a DRX_ON period of UE1 until UE1 has sufficient sensing results to enable UE1 to autonomously select resources based on the sensing results. This may occur during a later part of the DRX_ON period of UE1.

It should be noted that, in the above example and subsequent examples, "UE1" may be used to indicate an SL UE with SL DRX configured. The use of UE1 should not be considered to limit the scope of the present disclosures. For example, multiple SL UEs may be configured with SL DRX.

In an example embodiment, PSSCH resources may be randomly selected from a mode 2 resource pool by UE1 while the associated 1st stage of SCI carrying the information of the selected PSSCH resources is transmitted via dedicated PSCCH resource allocated to the UE by the network. While UE1 randomly selects the PSSCH resource(s) from the mode 2 resource pool, the allocated PSCCH resource(s) may be taken into account so that constraints on the PSCCH and PSSCH resources, at least in time domain, might be fulfilled. In other words, UE1 may perform random selection of PSSCH resources from the mode 2 resource pool, but the random selection may be limited by the allocation of PSCCH resources from the mode 1 resource pool.

Alternatively, PSSCH resources may be selected using partial sensing based resource selection or full sensing based resource selection. In the present description, use of the term "random selection" and similar should not be considered as limiting example embodiments to methods of resource selection that are based on no sensing history; methods of resource selectin based on some or full sensing may be considered within the scope of the present disclosure.

In an example embodiment, UE1 may detect a collision between its (randomly) selected PSSCH resource(s) and a resource(s) of another SL UE (e.g., UE2) based on UE1 monitoring of 1st stage SCIs transmitted over collision-free PSCCH resources from other proximity or nearby SL UEs (e.g., UE2 and/or UE3). In an example embodiment, UE1 may detect the collision of (randomly) selected PSSCH resources by either identifying the overlapping PSSCH resources used by other SL UE(s) (UE2), or receiving the collision indication from other SL UE(s) (UE3) in the form of its own UE ID (i.e. the ID of UE1) and/or resource information that is the same as its own randomly selected resource(s). UE1 may identify an overlap between used PSSCH resources by reading SCI(s) received from other proximity or nearby SL UE(s) (e.g., UE2). If, for example, UE2 indicates in SCI the resources that it is using, and UE1 has (randomly) selected one or more of the same resources for use, UE1 may identify the overlap. In the case of receiving a collision indication from, for example, UE3, UE3 may have detected an overlap between the resources used by UE1 and UE2, and may have transmitted a collision indication including one or more UE IDs (e.g., the ID of UE1 and/or UE2) to proximate or nearby SL UEs. Additionally or alternatively, the collision indication from, for example, UE3 may include information related to the resources it has detected to be involved in a collision. If the resource information overlaps with the (randomly) selected PSSCH resource(s) of UE1, UE1 may detect the collision based on the collision indication.

It should be noted that UE2 and UE3 may be SL UEs configured with DRX, or SL UEs not configured with DRX, or a combination of SL UEs that are or are not configured with DRX.

Figure 3:
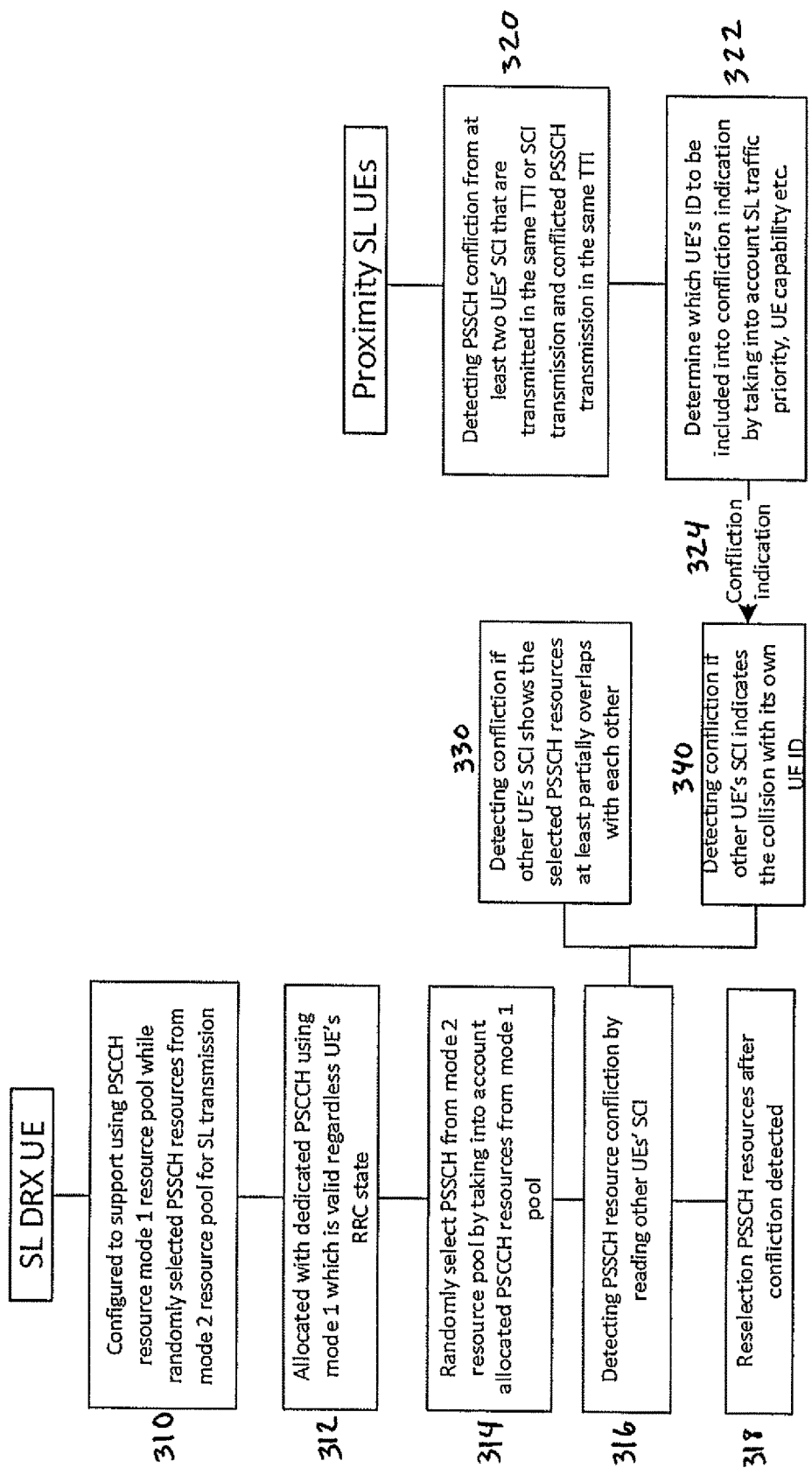
FIG. 3 is a diagram illustrating features as described herein.

Referring now to FIG. 3, illustrated are the behaviors of SL UEs configured according to example embodiments. In an example, there may be a SL UE configured with DRX in proximity with other SL UEs. The other SL UEs may or may not be configured with DRX. In the example of FIG. 3, SL DRX UE may be configured with Mode 1 resource allocation for PSCCH and associated PSSCH resources using mode 2 random selection, as described in one or more of the example embodiments above, by the serving network, together with other SL-related configurations. The serving network may configure the example SL DRX UE using either broadcast signaling (e.g. in SIB) or dedicated signaling (e.g. dedicated RRC message). A person of ordinary skill in the art would understand which methods the serving network may use to configure SL UEs with example embodiments of the present disclosure.

Referring now to FIG. 3, at 310, the SL DRX UE may determine that it is configured to support using Mode 1 resource allocation for PSCCH and/while randomly selecting PSSCH resources from mode 2 resource pool for sidelink transmission, as described in one or more of the example embodiments above. While in this example the SL DRX UE is configured to perform random selection of PSSCH resources, in other examples the SL DRX UE may be configured to perform other types of selection of PSSCH resources, which may include selecting PSSCH resources based on a partial or full sensing history. While the SL DRX UE is configured with SL DRX (i.e. the SL UE is DRX enabled), the SL UE may be triggered to enter RRC connected state in order to get/receive dedicated PSCCH resource allocation from the serving network, at 312. This allocation of PSCCH resources may be valid regardless of the SL DRX UE's RRC state. After receiving the PSCCH allocation from the NW, the SL DRX UE may enter an RRC idle or inactive state.

In an example embodiment, using regular procedures, the SL DRX UE may report SL traffic characteristic(s) to the network using SL UE information and/or UE assistance information, as specified for NR SL, in order to facilitate the serving NW to allocate suitable PSCCH resources in SPS/CG manner. For instance, the allocated PSCCH resources may, at least in time domain, be able to fulfill the requirements (e.g. traffic periodicity, latency requirement, etc.) in light of the traffic characteristics of the (reported) SL traffic.

In an example embodiment, the serving NW may help to avoid collision of randomly selected PSSCH resources at 314, as well as to help collision detection among multiple SL UEs (at 320, 330, and/or 340), by allocating non-overlapping PSCCH resources, perhaps at least in the time domain, to multiple SL UEs. In the example of FIG. 3, the serving NW may allocate non-overlapping PSCCH resources to the SL DRX UE and one or more proximity/nearby SL UEs.

In an example embodiment, the dedicated PSCCH resource(s) may be signaled to SL DRX UE using RRC signaling, which may be similar to CG type 1 RRC signaling. In an alternative example embodiment, using simplified or reduced procedures for optimization purposes, an SL UE with configured DRX operation while being in RRC idle/inactive state may be configured to indicate a new cause and/or a configured SL DRX profile in an RRC connection request sent to the serving BS in order to request for dedicated Mode 1 PSCCH resources. The new cause may be configured to indicate to the NW that the RRC connection request may have been triggered in order to request a dedicated PSCCH resource allocation for a UE configured with SL DRX. The configured SL DRX profile (related to the DRX cycle, i.e. ON or OFF period length) may be used by NW to configure the dedicated mode 1 SPS/CG type of PSCCH resources, such that the SPS/CG type of PSCCH resources may be configured to be valid at the beginning of each of the SL DRX on-periods until the sensing result in that ON-period is available. Thus, when the SL UE wakes up and enters the SL DRX ON-period, it may start sensing, and the SPS/CG type of PSCCH resources may be configured to be valid until the time period of configured sensing window has been passed, provided that the ON-period is longer than the sensing window. After the sensing is conducted in the SL DRX ON-period for sufficient time to collect the sensing history information, the SL DRX UE may automatically select SL transmission resources based on the outcome of the sensing, according to sensing based SL resource allocation mode 2. Alternatively, selection of SL transmission resources may be based on less of a sensing history than that specified in sensing based SL resource allocation mode 2, i.e. a partial sensing history.

Referring now to FIG. 3, after SL UE gets/receives the allocated mode 1 PSCCH resources at 312, SL UE may go back to RRC idle or inactive state. The allocated mode 1 PSCCH resources may be valid within the configured validity area, which may cover multiple neighboring cells. As the amount of required resource(s) for PSCCH to transmit 1st stage of SCI is much less than the amount of resource(s) required for PSSCH transmission of actual SL CP or UP data, it may be possible to have dedicated PSCCH resources in the area larger than one cell without introducing much inefficiency of resource usage.

At 314, the SL DRX UE may randomly select PSSCH resources from the mode 2 resource pool. This random selection may occur when SL DRX UE wakes up during an ON period of its DRX cycle. This random selection may take into account the PSCCH resources allocated from the mode 1 pool of resources at 312. This consideration of the allocated PSCCH resources may serve to prevent resource collision(s). For example, if there is a constraint on the time offset between PSCCH and associated PSSCH transmission, the randomly selected PSSCH resources may be randomly selected to comply with such a constraint, based on the allocated PSCCH resource in, at least, the time domain. In another example, if there are more allocated PSCCH resources than are actually needed for transmission of buffered SL CP and/or UP data to be transmitted by the SL DRX UE, the SL DRX UE may randomly select PSSCH resources in order to make it possible to associate multiple PSCCH resources to one PSSCH resource. In this way, multiple 1st stage SCIs may be transmitted over the selected PSCCH resources that are associated to one PSSCH transmission to improve the reliability of SCI transmission. In another example embodiment, the random selection may be based on at least some sensing performed by the SL DRX UE, i.e. a partial sensing history.

At 316, the SL DRX UE may detect a PSCCH resource collision/conflict. The SL DRX UE may detect the PSCCH resource collision based on, for example, SCI received from other proximity/nearby SL UEs.

At 330, the SL DRX UE may detect a resource collision if the received SCI from other/proximate/nearby UE(s) show/include one or more PSSCH resources that at least partially overlap with the PSSCH resources randomly selected at 314. Alternatively, the SL DRX UE may detect a resource collision if it receives SCI from other/proximate/ nearby SL UE(s) that indicates detection of a collision and including the SL UE ID of SL DRX UE or including the collided resources that at least partially overlap with the PSSCH resources randomly selected at 314.

At 320, a proximity/nearby SL UE may detect a PSSCH collision based on SCI received from at least two UEs. These SCI may be transmitted in the same transmission time interval (TTI) or SCI transmission. Alternatively, a proximity/nearby SL UE may receive conflicted PSSCH transmissions in the same TTI using at least partially overlapping PSSCH resources. At 322, a proximity/nearby SL UE may determine which UE's ID should be included into a collision indication. This decision may take into account an SL UE traffic priority associated with one or more SL UE(s) involved with the detected collision, an SL UE capability associated with one or more SL UE(s) involved with the detected collision, etc. At 324, the proximity/nearby SL UE may transmit a collision indication. This collision indication may be transmitted as part of SCI, and may be received by SL DRX UE at 340.

At 318, based on the detection of PSSCH resource collision by the SL DRX UE, the SL DRX UE may reselect PSSCH resources. Reselection may comprise random selection, partial sensing based selection, full sensing based selection, or some other type of selection of PSSCH resources.

Figure 4:
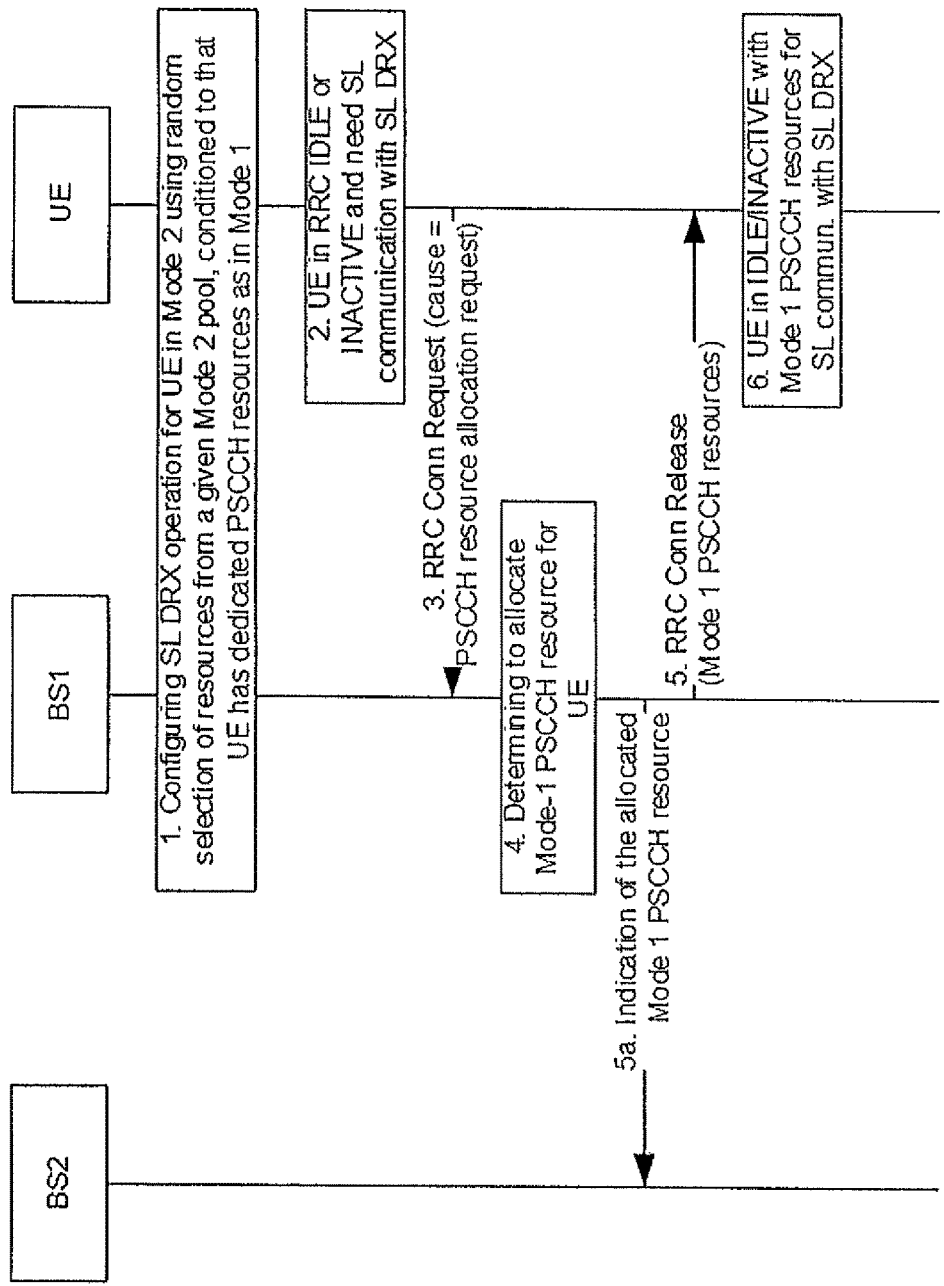
FIG. 4 is a diagram illustrating features as described herein.

Referring now to FIG. 4, illustrated are simplified or reduced procedures for PSCCH resource allocation for SL UE (configured) with DRX as, for example, at 312 of FIG. 3. In FIG. 4, illustrated are a UE, which, in this example, is a sidelink UE configured with discontinuous reception; a BS1; and a BS2. At 1, the BS1 may configure SL DRX operation for the UE in mode 2. This configuration may include configuring the UE to perform random selection of resources from a given mode 2 pool of resources. Alternatively, the configuration may include configuring the UE to perform selection of resources from a given mode 2 pool or resources using partial sensing based selection or full sensing based selection. This configuration may also include configuring the UE for allocation of dedicated PSCCH resources from a mode 1 resource pool, according to SL resource allocation mode 1.

At 2, the UE may be in an RRC IDLE mode or an RRC INACTIVE mode and may need to perform sidelink communication while performing sidelink discontinuous reception. Based on the configuration of the UE, the UE may need to be allocated with PSCCH resources by the network. Accordingly, the UE may transmit an RRC Connection Request to BS1 at 3. The RRC Connection Request may include a cause, such as a PSCCH resource allocation request.

At 4, the BS1 may determine to allocate mode 1 PSCCH resources for the UE. In an example embodiment, this allocation may be based on or influenced by allocations of PSCCH the BS1 has made to other SL UEs. In an example embodiment, this allocation may be based on or influenced by information related to SL traffic characteristics. At 5a, the BS1 may indicate, to BS2, the mode 1 PSCCH resource BS1 has determined to allocate to UE. This coordination with BS2 may serve to ensure that the allocated mode PSCCH resources of SL UE with DRX can be used throughout a validity area served by more than one BS. By coordinating on mode 1 PSCCH resource allocation as shown in step 5a, BS1 may ensure that BS2 is aware that UE will be using particular PSCCH resources and, accordingly, avoid action (e.g. resource allocation) that may result in a resource collision.

At 5, the BS1 may transmit an RRC Connection Release message to UE. This RRC Connection Release message may include the allocation of mode 1 resources determined at 4. At 6, the UE may be in an RRC IDLE or RRC INACTIVE mode. The UE may be configured to use the allocated mode 1 PSCCH resources for sidelink communication while performing SL DRX.

For detection of PSSCH resource collision, as at 316 of FIG. 3, an SL UE may determine or identify that other proximity/nearby SL UE(s) have reserved/selected resource(s) that at least partially overlap with its own randomly selected PSSCH resource(s). In an example embodiment, SL UE configured with DRX (UE1) may determine that its randomly selected resource(s) collide with the resources of a nearby SL UE (UE2) by reading SCIs of UE2. It should be noted that this kind of collision detection may only be possible among SL UEs that are transmitting SCIs in different transmission time intervals (TTI), due to half-duplex SL operation; therefore, in this example embodiment, UE1 and UE2 may be transmitting SCI with different TTI, such that the SCI of UE2 may be received by UE1.

It should be noted that while three UEs, UE1, UE2, and UE3, may be discussed in the foregoing and following examples, the example embodiments are not limited to interactions between three SL UEs; more or fewer SL UEs may be involved in a PSSCH resource collision, in PSSCH resource collision detection, and/or PSSCH resource collision resolution, according to example embodiments of the present disclosure. Furthermore, while in these examples UE1 is an SL UE configured with DRX that is experiencing a resource collision with UE2, in other examples other UEs, or multiple UEs, may be configured with DRX and/or may be determined to be associated with a resource collision with an SL UE configured with DRX. These examples are presented to simply explain example embodiments of the present disclosure, not to limit the scope of the present disclosure.

In another example embodiment, PSSCH resource collision may be detected if other proximity SL UE, for example UE3, identifies or determines that at least partially overlapping resources have been selected by two or more SL UEs, for example UE1 and UE2, by reading their SCIS. UE3 may indicate the resource collision in its own SCI transmission(s), for example as a resource collision indication included in an SCI. The resource collision indication may be in the form of overlapped resource block index or collided UE IDs. For example, for a detected resource collision between UE1 and UE2, the resource collision indication of UE3 may include a resource block index associated with one or more of the resource(s) determined to be overlapping between UE1 and UE2, and/or may include one or more UE IDs associated with the SL UEs for which the resource collision has been detected. In the present example, the UE ID of UE1 and/or UE2 may be included in the resource collision indication. In an example embodiment, UE3 may not indicate IDs for all the colliding UEs, but only IDs for selected one(s). The SL UE that is not involved in the resource collision but that has detected the resource collision, in the present example UE3, may determine to indicate one or more UE ID(s) based on, e.g., priority information indicated in the respective SCI of the colliding UEs, in the present example UE1 and UE2. For example, UE3 may indicate the ID of UE2 as the ID of the colliding UE in the resource collision indication, if the received priority from UE2 is lower than that from UE1.

In an example embodiment, because the ID of UE2 is indicated in the collision indication of UE3, UE2 may be triggered to detect the collision (based on the received SCI of UE3) and/or perform a PSSCH resource reselection procedure upon receiving the collision indication from UE3.

In an example embodiment, if an SL UE detects that its own resources are in collision with the resources of another SL UE by itself, the SL UE may be triggered to reselect PSSCH resources based on its own priority information, which it may provide in its own SCI, and the priority information of the one or more SL UEs with which its own resources collide, which may be provided in the SCI(s) of that one or more SL UE.

In an example, in case of collision between UE1 and UE2, UE2 may receive an indication of the collision from UE3. Although UE2 may not have identified the resource collision itself prior to receiving the collision indication from UE3, UE2 may stop transmitting the SCI over PSCCH in order to detect the collision by itself. This may enable UE2 to acquire more detailed information (e.g. priority information, collided resource blocks, etc.) related to the resource collision with the other colliding UE, in this example UE1. In addition, since the collision-indicating UE, here UE3, and the indicated colliding UE, here UE2, may not be co-located, this action by UE2 may also allow UE2 to check or determine whether the PSCCH transmission from colliding UE1 arrives at UE2 with a high sidelink reference signal received power (SL-RSRP) level or not. Based on the SL-RSRP level, UE2 may determine whether to trigger PSSCH resource reselection.

If PSSCH resource(s) are selected from a mode 2 pool of resources that is common for both random and sensing based resource selection, the colliding SL UE that applies random selection may be triggered to reselect PSSCH resources if the other colliding UE(s) use sensing based resource allocation. For example, if UE1 is configured to perform random selection and UE2 is configured to perform sensing based resource allocation, upon detection of a resource collision between UE1 and UE2, UE1 may be triggered to reselect PSSCH resources. Detection of whether other SL UE(s) are using random or sensing based resource selection may be based on whether associated PSCCH resources were allocated from a mode 1 or mode 2 resource pool, as disclosed in one or more of the example embodiments of the present disclosure. In other words, based on the resource pool to which the PSCCH resource(s) used by an SL UE belong, the PSSCH resource selection method used by the SL UE may be determined. Alternatively or additionally, the PSSCH resource selection method used by the SL UE may be determined based on an indication received in an SCI transmitted by the SL UE. For example, a 1 bit indication may be included in SCI that indicates whether the SL UE is using random or sensing based resource selection.

A technical effect of example embodiments of the present disclosure may be to introduce collision-free resource allocation for PSCCH transmission as well as use of PSCCH transmission on collision-free resource(s) to enable collision detection and avoidance of the randomly selected PSSCH resource.

Figure 5:
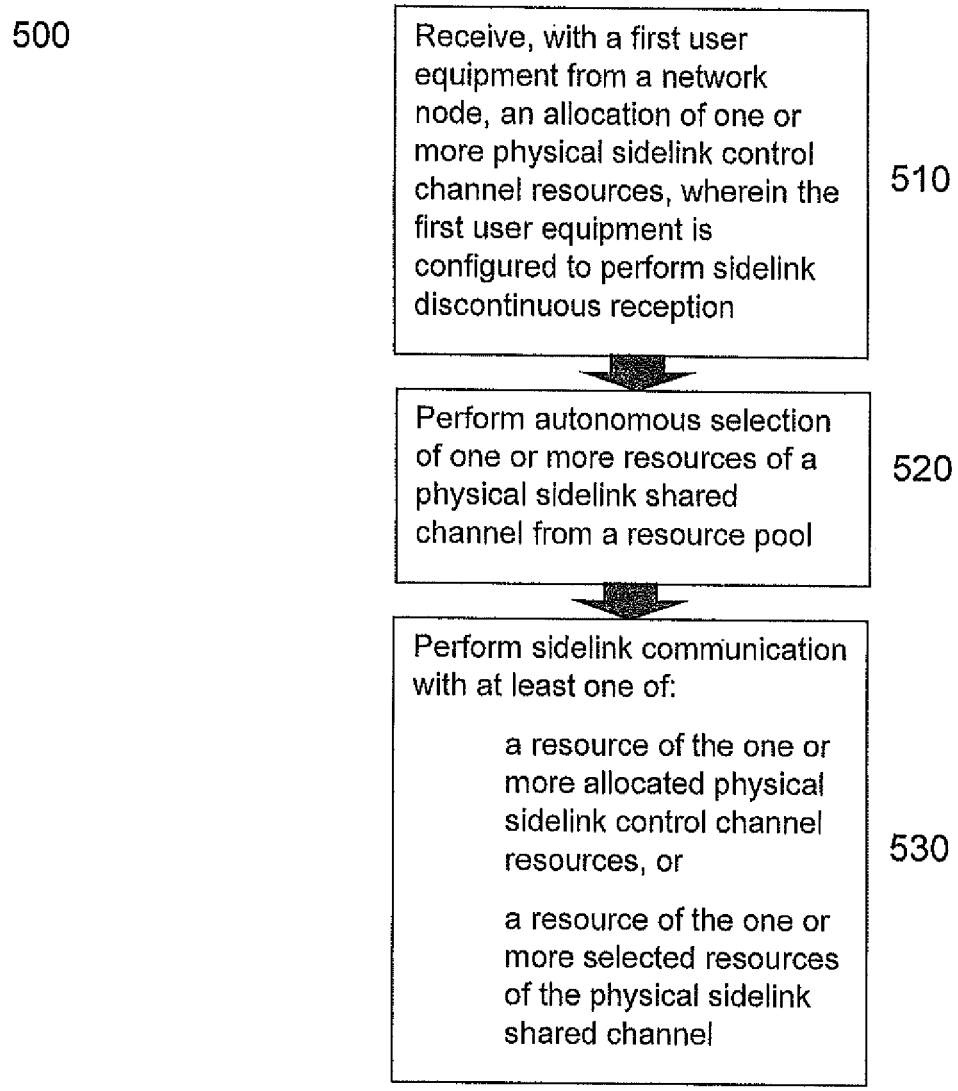
FIG. 5 is a flowchart illustrating steps as described herein.

FIG. 5 illustrates the potential steps of an example method 500. The example method 500 may include receiving, with a first user equipment from a network node, an allocation of one or more physical sidelink control channel resources, wherein the first user equipment is configured to perform sidelink discontinuous reception, 510; performing autonomous selection of one or more resources of a physical sidelink shared channel from a resource pool, 520; and performing sidelink communication with at least one of: a resource of the one or more allocated physical sidelink control channel resources, or a resource of the one or more selected resources of the physical sidelink shared channel, 530. The autonomous selection of the one or more resources of the physical sidelink shared channel from the resource pool may comprise performing random selection. Methods of random selection within a set are known to persons of ordinary skill in the art. Additionally or alternatively, the autonomous selection may be based on an available sensing history, which may be a partial sensing history or a full sensing history.

Figure 6:
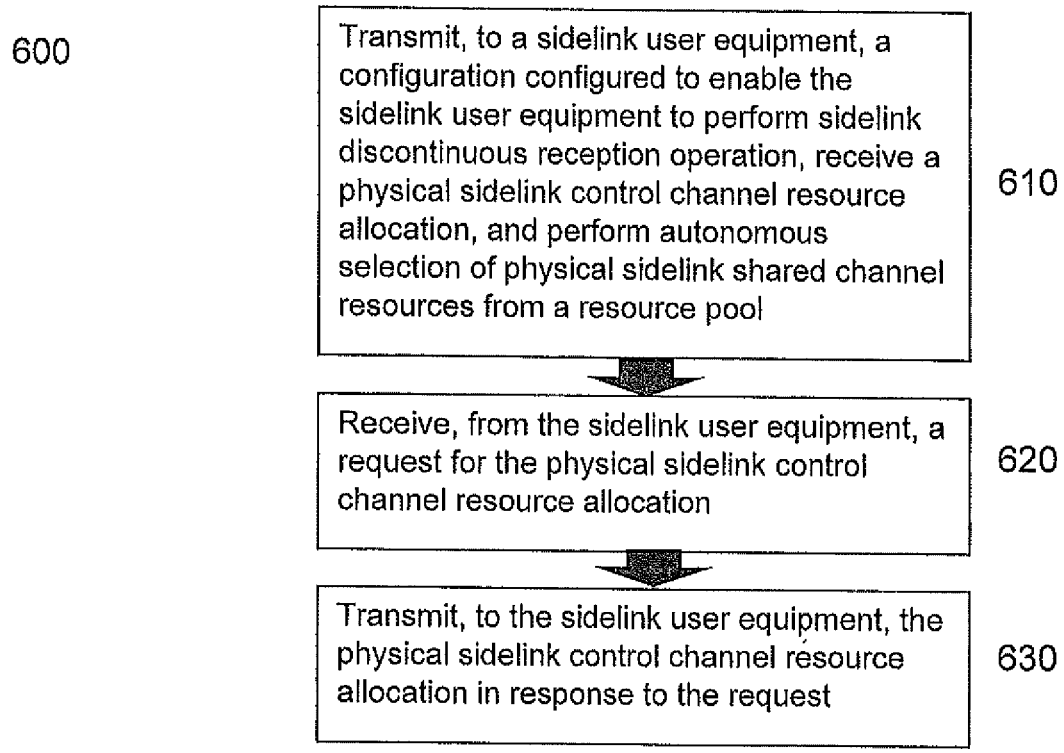
FIG. 6 is a flowchart illustrating steps as described herein.

FIG. 6 illustrates the potential steps of an example method 600. The example method 600 may include transmitting, to a sidelink user equipment, a configuration configured to enable the sidelink user equipment to perform sidelink discontinuous reception operation, receive a physical sidelink control channel resource allocation, and perform autonomous selection of physical sidelink shared channel resources from a resource pool, 610; receiving, from the sidelink user equipment, a request for the physical sidelink control channel resource allocation, 620; and transmitting, to the sidelink user equipment, the physical sidelink control channel resource allocation in response to the request, 630. The autonomous selection that the configuration enables the sidelink user equipment to perform may be, for example, random selection. Additionally or alternatively, the autonomous selection may be based on a sensing history available to or accumulated by the sidelink user equipment, which may be a partial sensing history or a full sensing history. Additionally or alternatively, the configuration of 610 may be configured to enable the sidelink user equipment to perform sidelink discontinuous reception operation.

In accordance with one aspect, an example method may be provided comprising: receiving, with a first user equipment from a network node, an allocation of one or more physical sidelink control channel resources, wherein the first user equipment may be configured to perform sidelink discontinuous reception; performing autonomous selection of one or more resources of a physical sidelink shared channel from a resource pool; and performing sidelink communication with at least one of: a resource of the one or more allocated physical sidelink control channel resources, or a resource of the one or more selected resources of the physical sidelink shared channel.

The example method may further comprise: performing a sensing procedure during an on period of the first user equipment.

The performing of the sidelink communication may comprise: performing sidelink transmission with at least one of: the resource of the one or more allocated physical sidelink control channel resources, or the resource of the one or more selected resources of the physical sidelink shared channel.

The performing of the sensing procedure may comprise receiving sidelink control information from one or more other user equipment(s).

The performing of the autonomous selection of the one or more resources of the physical sidelink shared channel from the resource pool may comprise selecting one or more resources from the resource pool using at least one of: random selection, partial sensing based selection, or full sensing based selection.

The received sidelink control information may comprise first stage sidelink control information received with at least one of the one or more allocated physical sidelink control channel resources of the first user equipment.

The example method may further comprise: detecting a resource collision between at least one of the one or more selected resources of the physical sidelink shared channel of the first user equipment and at least one physical sidelink shared channel resource selected by a second user equipment based, at least partially, on receiving a sidelink transmission with the resource of the one or more allocated physical sidelink control channel resources.

The detecting of the resource collision may comprise at least one of: receiving a sidelink control information from the second user equipment that may comprise an indication of the at least one selected physical sidelink shared channel resource of the second user equipment, and determining that the at least one selected physical sidelink shared channel resource of the second user equipment overlaps with the at least one selected resource of the first user equipment; or receiving a sidelink transmission from a third user equipment that may comprise a collision indication, wherein the collision indication may comprise at least one of an identifier of the first user equipment or an indication of the at least one selected resource of the first user equipment.

The sidelink transmission received from the third user equipment may comprise at least one of: a sidelink control information, or a medium access control control element.

The example method may further comprise: reselecting at least one resource of the physical sidelink shared channel from the resource pool based on the detected resource collision, based at least partially on at least one of a priority of the apparatus or a priority of the second user equipment, or based at least partially on the additional sidelink control information.

The reselecting may be based, at least partially, on at least one of a priority of the first user equipment or a priority of the second user equipment.

The example method may further comprise: in response to the detecting of the resource collision, stopping transmission of the first user equipment with the one or more allocated physical sidelink control channel resources; and performing sensing for additional sidelink control information from the second user equipment, wherein the reselecting may be based, at least partially, on the additional sidelink control information.

The first user equipment may not perform a sensing procedure before the performing of the autonomous selection of the one or more resources from the physical sidelink shared channel resource pool.

The receiving of the allocation of the one or more physical sidelink control channel resources may comprise receiving, with the first user equipment, a sidelink resource allocation from the network node.

The resource pool may comprise a pool of resources autonomously selected by the first user equipment.

The receiving of the allocation of the one or more physical sidelink control channel resources may comprise receiving an allocation of: semi-persistent scheduling type of dedicated physical sidelink control channel resources, or configured grant type of dedicated physical sidelink control channel resources.

The received allocation of the one or more physical sidelink control channel resources may be configured to be valid where the first user equipment is in any of: a radio resource control connected state, a radio resource control idle state, or a radio resource control inactive state.

The received allocation of the one or more physical sidelink control channel resources may be configured to be valid at least within a configured validity area including the network node.

The performing of the autonomous selection of the one or more resources of the physical sidelink shared channel from the resource pool may be based, at least partially, on the one or more allocated physical sidelink control channel resources.

The performing of the autonomous selection of the one or more resources of the physical sidelink shared channel from the resource pool may correspond to at least one of the one or more allocated physical sidelink control channel resources in a time domain.

The first user equipment may be configured to support the receiving of the allocation of the one or more physical sidelink control channel resources and the performing of the autonomous selection of the one or more resources of the physical sidelink shared channel from the resource pool based on at least one of: broadcast signaling, or dedicating signaling received from the network node.

The receiving of the allocation of the one or more physical sidelink control channel resources may comprise transmitting, to the network node with the first user equipment, at least one message comprising at least one of: sidelink traffic characteristics, sidelink DRX configuration related information, or a request for a physical sidelink control channel resource allocation; and receiving, in response, the allocation of the one or more physical sidelink control channel resources while the first user equipment is in a radio resource control connected state.

The transmitting of the at least one message to the network node may comprise transmitting at least one radio resource control connection establishment procedure message to the network node, and the receiving, in response, of the allocation may comprise receiving at least one radio resource control connection establishment procedure message from the network node.

The performing of the autonomous selection of the one or more resources may be based, at least partially, on a number of the one or more allocated physical sidelink control channel resources.

In accordance with one example embodiment, an apparatus may comprise: at least one processor; and at least one memory including computer program code; the at least one memory and the computer program code configured to, with the at least one processor, cause the apparatus to: receive, from a network node, an allocation of one or more physical sidelink control channel resources, wherein the apparatus may be configured to perform sidelink discontinuous reception; perform autonomous selection of one or more resources of a physical sidelink shared channel from a resource pool; and perform sidelink communication with at least one of: a resource of the one or more allocated physical sidelink control channel resources, or a resource of the one or more selected resources of the physical sidelink shared channel.

Performing the sidelink communication may comprise the at least one memory and the computer program code are configured to, with the at least one processor, cause the apparatus to: perform sidelink transmission with at least one of: the resource of the one or more allocated physical sidelink control channel resources, or the resource of the one or more selected resources of the physical sidelink shared channel.

Performing the autonomous selection of the one or more resources of the physical sidelink shared channel from the resource pool may comprise the at least one memory and the computer program code are configured to, with the at least one processor, cause the apparatus to: select one or more resources from the resource pool using at least one of: random selection, partial sensing based selection, or full sensing based selection.

The at least one memory and the computer program code may be further configured to, with the at least one processor, cause the apparatus to: detect a resource collision between at least one of the one or more selected resources of the physical sidelink shared channel of the apparatus and at least one physical sidelink shared channel resource selected by a second user equipment based, at least partially, on receiving a sidelink transmission with the resource of the one or more allocated physical sidelink control channel resources.

Detecting the resource collision may comprise the at least one memory and the computer program code are configured to, with the at least one processor, cause the apparatus to at least one of: receive a sidelink control information from the second user equipment comprising an indication of the at least one selected physical sidelink shared channel resource of the second user equipment, and determine that the at least one selected physical sidelink shared channel resource of the second user equipment overlaps with the at least one selected resource of the apparatus; or receive a sidelink transmission from a third user equipment comprising a collision indication, wherein the collision indication may comprise at least one of an identifier of the apparatus or an indication of the at least one selected resource of the apparatus.

The sidelink transmission received from the third user equipment may comprise at least one of: a sidelink control information, or a medium access control control element.

The at least one memory and the computer program code may be further configured to, with the at least one processor, cause the apparatus to: reselect at least one resource of the physical sidelink shared channel from the resource pool based on the detected resource collision, based at least partially on at least one of a priority of the apparatus or a priority of the second user equipment, or based at least partially on the additional sidelink control information.

Reselecting may be based, at least partially, on at least one of a priority of the apparatus or a priority of the second user equipment.

The at least one memory and the computer program code may be further configured to, with the at least one processor, cause the apparatus to: in response to detecting the resource collision, stop transmission with the one or more allocated physical sidelink control channel resources; and perform sensing for additional sidelink control information from the second user equipment, wherein reselecting may be based, at least partially, on the additional sidelink control information.

The resource pool may comprise a pool of resources autonomously selected by the apparatus.

Receiving the allocation of the one or more physical sidelink control channel resources may comprise the at least one memory and the computer program code being configured to, with the at least one processor, cause the apparatus to: receive, from the network node, an allocation of: semi-persistent scheduling type of dedicated physical sidelink control channel resources, or configured grant type of dedicated physical sidelink control channel resources.

Receiving the allocation of the one or more physical sidelink control channel resources may comprise the at least one memory and the computer program code are configured to, with the at least one processor, cause the apparatus to: receive a sidelink resource allocation from the network node.

The resource pool may comprise a pool of resources autonomously selected by the apparatus.

Receiving the allocation of the one or more physical sidelink control channel resources may comprise the at least one memory and the computer program code are configured to, with the at least one processor, cause the apparatus to: receive an allocation of: semi-persistent scheduling type of dedicated physical sidelink control channel resources, or configured grant type of dedicated physical sidelink control channel resources.

The received allocation of the one or more physical sidelink control channel resources may be configured to be valid where the apparatus is in any of: a radio resource control connected state, a radio resource control idle state, or a radio resource control inactive state.

The received allocation of the one or more physical sidelink control channel resources may be configured to be valid at least within a configured validity area including the network node.

Performing the autonomous selection of the one or more resources of the physical sidelink shared channel from the resource pool may be based, at least partially, on the one or more allocated physical sidelink control channel resources.

Performing the autonomous selection of the one or more resources of the physical sidelink shared channel from the resource pool may correspond to at least one of the one or more allocated physical sidelink control channel resources in a time domain.

The example apparatus may be configured to support receiving the allocation of the one or more physical sidelink control channel resources and performing the autonomous selection of the one or more resources of the physical sidelink shared channel from the resource pool based on at least one of: broadcast signaling, or dedicating signaling received from the network node.

Receiving the allocation of the one or more physical sidelink control channel resources may comprise the at least one memory and the computer program code are configured to, with the at least one processor, cause the apparatus to: transmit, to the network node, at least one message comprising at least one of: sidelink traffic characteristics, sidelink DRX configuration related information, or a request for a physical sidelink control channel resource allocation; and receive, in response, the allocation of the one or more physical sidelink control channel resources while in a radio resource control connected state.

Transmitting the at least one message to the network node may comprise the at least one memory and the computer program code are configured to, with the at least one processor, cause the apparatus to transmit at least one radio resource control connection establishment procedure message to the network node, and receiving the allocation may comprise the at least one memory and the computer program code are configured to, with the at least one processor, cause the apparatus to receive at least one radio resource control connection establishment procedure message from the network node. Performing the autonomous selection of the one or more resources may be based, at least partially, on a number of the one or more allocated physical sidelink control channel resources.

In accordance with one example embodiment, an apparatus may comprise: circuitry configured to perform receiving, with a first user equipment from a network node, an allocation of one or more physical sidelink control channel resources, wherein the first user equipment is configured to perform sidelink discontinuous reception; circuitry configured to perform autonomous selection of one or more resources of a physical sidelink shared channel from a resource pool; and circuitry configured to perform sidelink communication with at least one of: a resource of the one or more allocated physical sidelink control channel resources, or a resource of the one or more selected resources of the physical sidelink shared channel.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving, from a network node, an allocation of one or more physical sidelink control channel resources, wherein the apparatus may be configured to perform sidelink discontinuous reception; performing autonomous selection of one or more resources of a physical sidelink shared channel from a resource pool; and performing sidelink communication with at least one of: a resource of the one or more allocated physical sidelink control channel resources, or a resource of the one or more selected resources of the physical sidelink shared channel.

In accordance with one example embodiment, a non-transitory computer-readable medium comprising program instructions stored thereon which, when executed with at least one processor, cause the at least one processor to: receive, with a first user equipment from a network node, an allocation of one or more physical sidelink control channel resources, wherein the first user equipment may be configured to perform sidelink discontinuous reception; perform autonomous selection of one or more resources of a physical sidelink shared channel from a resource pool; and perform sidelink communication with at least one of: a resource of the one or more allocated physical sidelink control channel resources, or a resource of the one or more selected resources of the physical sidelink shared channel.

In accordance with one aspect, an example method may be provided comprising: transmitting, to a sidelink user equipment, a configuration configured to enable the sidelink user equipment to perform sidelink discontinuous reception operation, receive a physical sidelink control channel resource allocation, and perform autonomous selection of physical sidelink shared channel resources from a resource pool; receiving, from the sidelink user equipment, a request for the physical sidelink control channel resource allocation; and transmitting, to the sidelink user equipment, the physical sidelink control channel resource allocation in response to the request.

In accordance with one example embodiment, an apparatus may comprise: at least one processor; and at least one memory including computer program code; the at least one memory and the computer program code configured to, with the at least one processor, cause the apparatus to: transmit, to a sidelink user equipment, a configuration configured to enable the sidelink user equipment to perform sidelink discontinuous reception operation, receive a physical sidelink control channel resource allocation, and perform autonomous selection of physical sidelink shared channel resources from a resource pool; receive, from the sidelink user equipment, a request for the physical sidelink control channel resource allocation; and transmit, to the sidelink user equipment, the physical sidelink control channel resource allocation in response to the request.

In accordance with one example embodiment, an apparatus may comprise: circuitry configured to perform transmitting, to a sidelink user equipment, a configuration configured to enable the sidelink user equipment to perform sidelink discontinuous reception operation, receive a physical sidelink control channel resource allocation, and perform autonomous selection of physical sidelink shared channel resources from a resource pool; circuitry configured to perform receiving, from the sidelink user equipment, a request for the physical sidelink control channel resource allocation; and circuitry configured to perform transmitting, to the sidelink user equipment, the physical sidelink control channel resource allocation in response to the request.

In accordance with one example embodiment, an apparatus may comprise means for performing: transmitting, to a sidelink user equipment, a configuration configured to enable the sidelink user equipment to perform sidelink discontinuous reception operation, receive a physical sidelink control channel resource allocation, and perform autonomous selection of physical sidelink shared channel resources from a resource pool; receiving, from the sidelink user equipment, a request for the physical sidelink control channel resource allocation; and transmitting, to the sidelink user equipment, the physical sidelink control channel resource allocation in response to the request.

In accordance with one example embodiment, a non-transitory computer-readable medium comprising program instructions stored thereon which, when executed with at least one processor, cause the at least one processor to: transmit, to a sidelink user equipment, a configuration configured to enable the sidelink user equipment to perform sidelink discontinuous reception operation, receive a physical sidelink control channel resource allocation, and perform autonomous selection of physical sidelink shared channel resources from a resource pool; receive, from the sidelink user equipment, a request for the physical sidelink control channel resource allocation; and transmit, to the sidelink user equipment, the physical sidelink control channel resource allocation in response to the request.

In accordance with one example embodiment, an apparatus may comprise: at least one processor; and at least one memory including computer program code; the at least one memory and the computer program code configured to, with the at least one processor, cause the apparatus to: transmit, to a sidelink user equipment, a configuration configured to enable the sidelink user equipment to perform sidelink discontinuous reception operation; receive, from the sidelink user equipment, a request for the physical sidelink control channel resource allocation; and transmit, to the sidelink user equipment, the physical sidelink control channel resource allocation in response to the request.

Transmitting the physical sidelink control channel resource allocation may comprise the at least one memory and the computer program code being configured to, with the at least one processor, cause the apparatus to: transmit the physical sidelink control channel resource allocation of: semi-persistent scheduling type of dedicated physical sidelink control channel resources, or configured grant type of dedicated physical sidelink control channel resources.

The physical sidelink control channel resource allocation may be configured to be valid where the sidelink user equipment is in any of: a radio resource control connected state, a radio resource control idle state, or a radio resource control inactive state.

The physical sidelink control channel resource allocation may be configured to be valid at least within a configured validity area including the apparatus.

Transmitting the physical sidelink control channel resource allocation may comprise the at least one memory and the computer program code are configured to, with the at least one processor, cause the apparatus to: receive, from the sidelink user equipment, at least one message comprising at least one of: sidelink traffic characteristics, sidelink DRX configuration related information, or a request for a physical sidelink control channel resource allocation; and transmit, in response, the allocation of the one or more physical sidelink control channel resources while in a radio resource control connected state.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A method comprising:
   receiving, with a first user equipment from a network node, an allocation of one or more physical sidelink control channel resources from a mode 1 resource pool, wherein the one or more physical sidelink control channel resources are configured to be valid during an on period of sidelink discontinuous reception until a sensing result of the on period is available, wherein the first user equipment is configured to perform the sidelink discontinuous reception;
   performing random selection of one or more resources of a physical sidelink shared channel from a mode 2 resource pool, wherein the random selection is limited by the allocation of physical sidelink shared channel resources from the mode 1 resource pool;
   performing sidelink communication with a resource of the one or more randomly selected resources of the physical sidelink shared channel in response to the sensing result of the on period being available; and
   detecting a resource collision between at least one of the one or more selected resources of the physical sidelink shared channel of the first user equipment and at least one physical sidelink shared channel resource selected by a second user equipment based, at least partially, on receiving a sidelink transmission with the resource from the one or more allocated physical sidelink control channel resources;
   wherein the detecting the resource collision comprises receiving a sidelink control information from the second user equipment comprising an indication of the at least one selected physical sidelink shared channel resource of the second user equipment, and determine that the at least one selected physical sidelink shared channel resource of the second user equipment overlaps with the at least one selected resource of the first user equipment, and wherein the random selection of the physical sidelink shared channel resources is performed based on a partial sensing history or full sensing history.

2. An apparatus comprising:

at least one processor; and at least one non-transitory memory and computer program code, wherein the at least one memory and the computer program code are configured to, with the at least one processor, cause the apparatus to:

receive, from a network node, an allocation of one or more physical sidelink control channel resources from a mode 1 resource pool, wherein the one or more physical sidelink control channel resources are configured to be valid during an on period of sidelink discontinuous reception until a sensing result of the one period is available, wherein the apparatus is configured to perform the sidelink discontinuous reception;

perform random selection of one or more resources of a physical sidelink shared channel from a mode 2 resource pool, wherein the random selection is limited by the allocation of physical sidelink shared channel resources from the mode 1 resource pool;

perform sidelink communication with a resource of the one or more randomly selected resources of the physical sidelink shared channel in response to the sensing result of the on period being available; and detect a resource collision between at least one of the one or more selected resources of the physical sidelink shared channel of the apparatus and at least one physical sidelink shared channel resource selected by a second user equipment based, at least partially, on receiving a sidelink transmission with the resource from the one or more allocated physical sidelink control channel resources;

wherein detecting the resource collision comprises receive a sidelink control information from the second user equipment comprising an indication of the at least one selected physical sidelink shared channel resource of the second user equipment, and determine that the at least one selected physical sidelink shared channel resource of the second user equipment overlaps with the at least one selected resource of the apparatus, and wherein the random selection of the physical sidelink shared channel resources is performed based on a partial sensing history or full sensing history.

3. The apparatus of claim 2, wherein detecting the resource collision comprises the at least one memory and the computer program code are configured to, with the at least one processor, cause the apparatus to at least one of:

receive a sidelink transmission from a third user equipment comprising a collision indication, wherein the collision indication comprises at least one of an identifier of the apparatus or an indication of the at least one selected resource of the apparatus.

4. The apparatus of claim 3, wherein the sidelink transmission received from the third user equipment comprises at least one of:

a sidelink control information, or a medium access control element.

5. The apparatus of claim 2, wherein the at least one memory and the computer program code are further configured to, with the at least one processor, cause the apparatus to:

reselect at least one resource of the physical sidelink shared channel from the mode 1 resource pool based on the detected resource collision, based at least partially on at least one of a priority of the apparatus or a priority of the second user equipment, or based at least partially on additional sidelink control information.

6. The apparatus of claim 2, wherein the at least one memory and the computer program code are further configured to, with the at least one processor, cause the apparatus to:

in response to detecting the resource collision, stop transmission with the one or more allocated physical sidelink control channel resources; and perform sensing for additional sidelink control information from the second user equipment.

7. The apparatus of claim 2, wherein receiving the allocation of the one or more physical sidelink control channel resources comprises the at least one memory and the computer program code are configured to, with the at least one processor, cause the apparatus to:

receive, from the network node, an allocation of:

semi-persistent scheduling type of dedicated physical sidelink control channel resources, or configured grant type of dedicated physical sidelink control channel resources.

8. The apparatus of claim 2, wherein the received allocation of the one or more physical sidelink control channel resources is configured to be valid where the apparatus is in any of:

a radio resource control connected state, a radio resource control idle state, or a radio resource control inactive state.

9. The apparatus of claim 2, wherein the received allocation of the one or more physical sidelink control channel resources is configured to be valid at least within a configured validity area including the network node.

10. The apparatus of claim 2, wherein receiving the allocation of the one or more physical sidelink control channel resources comprises the at least one memory and the computer program code are configured to, with the at least one processor, cause the apparatus to:

transmit, to the network node, at least one message comprising at least one of:

sidelink traffic characteristics, sidelink discontinuous reception configuration related information, or a request for a physical sidelink control channel resource allocation; and receive, in response, the allocation of the one or more physical sidelink control channel resources while in a radio resource control connected state.

11. The apparatus of claim 10, wherein transmitting the at least one message to the network node comprises the at least one memory and the computer program code are configured to, with the at least one processor, cause the apparatus to transmit at least one radio resource control connection establishment procedure message to the network node, and wherein receiving the allocation comprises the at least one memory and the computer program code are configured to, with the at least one processor, cause the apparatus to receive at least one radio resource control connection establishment procedure message from the network node.

12. An apparatus, comprising:

at least one processor; and at least one non-transitory memory and computer program code, wherein the at least one memory and the computer program code are configured to, with the at least one processor, cause the apparatus to:

transmit, to a sidelink user equipment, a configuration configured to enable the sidelink user equipment to perform sidelink discontinuous reception operation;

receive, from the sidelink user equipment, a request for a physical sidelink control channel resource allocation;

transmit, to the sidelink user equipment, the physical sidelink control channel resource allocation from a mode 1 resource pool in response to the request, wherein the physical sidelink control channel resource allocation comprises one or more physical sidelink control channel resources that are confirmed to be valid during an on period of the sidelink discontinuous reception operation until a sensing result of the on period is available, wherein a resource of the one or more allocated physical sidelink control channel resources is configured to be used for performing sidelink communication before a resource is randomly selected, in response to the sensing result of the on period being available, from a mode 2 resource pool of one or more resources of a physical sidelink shared channel, wherein the random selection is limited by the allocation of physical sidelink shared channel resources from the mode 1 resource pool;

transmit the physical sidelink control channel resource allocation of semi-persistent scheduling type of dedicated physical sidelink control channel resources and configured grant type of dedicated physical sidelink control channel resources;

receive, from the sidelink user equipment, at least one message comprising sidelink traffic characteristics and sidelink discontinuous reception configuration related information.

13. The apparatus of claim 12, wherein the physical sidelink control channel resource allocation is configured to be valid where the sidelink user equipment is in any of:

a radio resource control connected state, a radio resource control idle state, or a radio resource control inactive state.

14. The apparatus of claim 12, wherein the physical sidelink control channel resource allocation is configured to be valid at least within a configured validity area including the apparatus.

15. The apparatus of claim 12, wherein transmitting the physical sidelink control channel resource allocation comprises the at least one memory and the computer program code are configured to, with the at least one processor, cause the apparatus to:

receive, from the sidelink user equipment, at least one message comprising at least one of:

a request for a physical sidelink control channel resource allocation; and transmit, in response, the physical sidelink control channel resource allocation while the sidelink user equipment is in a radio resource control connected state.

* * * * *